United States Patent [19]

Windsor et al.

[11] 4,034,204

[45] July 5, 1977

[54] ELECTRIC HEATER FOR WARMING THE INTERIOR OF A CAR

[75] Inventors: Lynne E. Windsor; Lawrence Smorang, both of Winnipeg, Canada

[73] Assignee: James B. Carter Limited, Winnipeg, Canada

[22] Filed: June 13, 1975

[21] Appl. No.: 586,564

[30] Foreign Application Priority Data

June 28, 1974 Canada .................................. 203699

[52] U.S. Cl. .................................. 219/368; 165/43; 165/125; 219/202; 219/365; 219/370; 219/375; 237/12.3 A

[51] Int. Cl.² ...................... H05B 1/00; F24H 3/04; B60H 1/02

[58] Field of Search ........................... 219/366–371, 219/365, 364, 377, 374–376, 536, 202; 165/124, 125, 122, 41, 42, 43; 34/96–101, 243; 237/12.3 R, 12.3 A

[56] References Cited

UNITED STATES PATENTS

| | | | |
|---|---|---|---|
| 1,614,168 | 1/1927 | Abbott | 219/365 UX |
| 1,798,290 | 3/1931 | Winner et al. | 219/368 |
| 1,848,716 | 3/1932 | Hart et al. | 219/365 |
| 1,977,357 | 10/1934 | Slayback | 219/368 X |
| 1,979,883 | 11/1934 | Hynes | 219/368 X |
| 2,158,603 | 5/1939 | Calhoun | 219/365 X |
| 2,385,295 | 9/1945 | MacGregor | 219/368 |
| 2,765,393 | 10/1956 | Theisen | 219/364 |
| 3,223,828 | 12/1965 | Mast | 219/370 |
| 3,229,070 | 1/1966 | Wells | 219/370 |

FOREIGN PATENTS OR APPLICATIONS

| | | | |
|---|---|---|---|
| 102,697 | 9/1965 | Denmark | 219/370 |
| 677,139 | 8/1952 | United Kingdom | 219/369 |
| 869,579 | 5/1961 | United Kingdom | 219/368 |

*Primary Examiner*—A. Bartis
*Attorney, Agent, or Firm*—Stanley G. Ade

[57] ABSTRACT

An electric heater for warming the interior of cars, trucks and the like includes a relatively short cylindrical casing having a base end plate, an air intake end plate and a circumferential side wall. A motor driven fan is provided in the casing and arranged to draw air in axially through the intake for radial expulsion through discharge perforations in the side wall through 360°. An electric heating element formed in a single length counterangulated to form inner and outer portions is arranged in the casing between the motor driven fan and the sidewall for heating the air prior to expulsion. The heating element is supported by a combined air deflector and support bracket extending 180° within the casing. A guard strip supported by the bracket is provided between the heating element and casing side wall. A thermostatic control is situated in the casing between the fan motor and bracket so as to be shielded from the heating element by the bracket.

8 Claims, 6 Drawing Figures

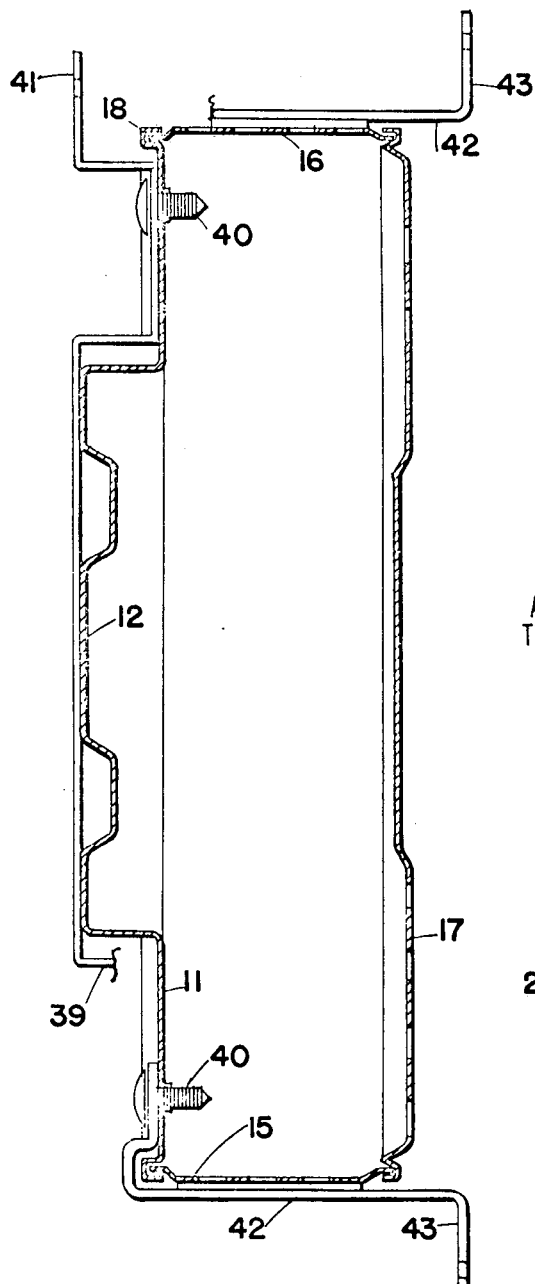
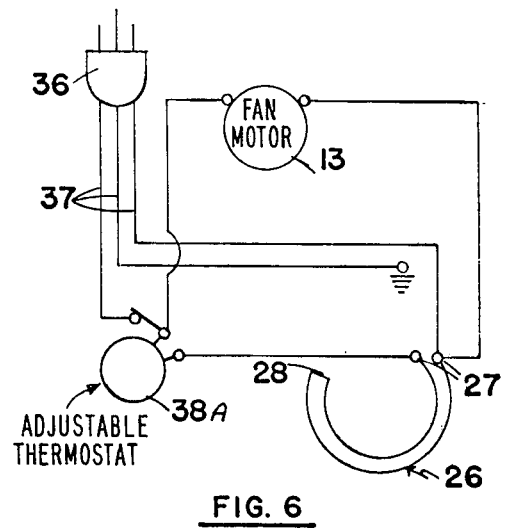
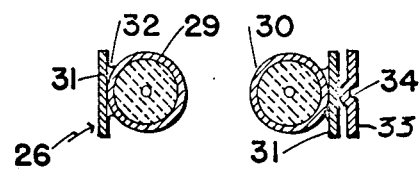
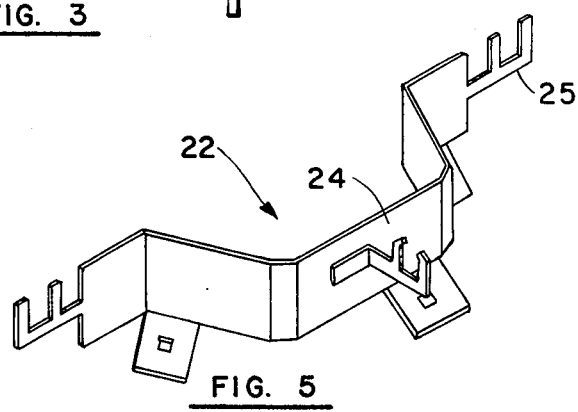

ELECTRIC HEATER FOR WARMING THE INTERIOR OF A CAR

BACKGROUND OF THE INVENTION

This invention relates to new and useful improvements in interior car warmers normally used in cold climates to maintain the interior of the car in a relatively warm condition while same is parked. Although the device is referred to as a "car warmer" nevertheless it will of course be appreciated that it can be used in trucks, mobile homes or any other structure desired.

Conventionally such car warmers are provided with substantially rectangular sided casings and these are relatively bulky. Due to the restricted space available within a car body for the mounting of such devices, location is severely limited. Furthermore due to the rectangular configuration they are somewhat dangerous to passengers particularly in an accident situation.

Such conventional devices also normally discharge the air from one face only once again limiting the location in which they can be placed and because of this, they tend to generate hot spots so that considerable care must be taken not only in the mounting of the devices but also to avoid touching various areas of the casing after the device has been operating for some considerable time.

Also such devices, when used to heat the interior of mobile homes, travel trailers or the like, are somewhat noisy so that they can be irritating to the occupants of such structures.

SUMMARY OF THE INVENTION

The present invention overcomes all of these disadvantages inasmuch as it is contained within a relatively short cylindrical casing which is provided with an apertured end through which the air is drawn by means of a fan. After passing over a heating element within the casing, the air is expelled through the circumferential wall of the casing which is multi-apertured, said discharge air being expelled through the entire 360° of the wall.

This enables the device to be mounted horizontally or vertically and because of the relatively large air discharge area, cooler operating case temperatures are obtained.

A specially designed fan blade, in conjunction with the spacing and size of the air intake apertures, reduces the noise level considerably and the heating element is provided with a heat radiating strip together with a guard strip so that access cannot be obtained inadvertently, to the hottest part of the device. The guard strip permits the heater to be mounted vertically by preventing or deflecting molten metal, sparks etc. from falling from the heater in the event of burn out of the heater element or motor.

The principal object and essence of the invention is therefore to provide a relatively low profile car warmer or car heater which can be mounted horizontally or vertically in a plurality of locations and which discharges heated air through 360°.

Another object of the invention is to provide a device of the character herewithin described in which the radiating heat element is improved in efficiency due to the provision of a radiating strip secured thereto.

Still another object of the invention is to provide a device of the character herewithin described which has a cooler operating case temperature and is relatively quiet in use.

Still another object of the invention is to provide a device of the character herewithin described which eliminates sharp corners or edges thus making the device safer than conventional devices of this type.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 3 is a cross sectional view of the casing of FIG. 1 showing alternative mounting means.

FIG. 4 is an enlarged fragmentary cross sectional view of the heater element per se.

FIG. 5 is an outer side elevation of the air baffle and element support bracket per se.

FIG. 6 is a schematic wiring diagram of the device.

In the drawings like characters of reference indicate corresponding parts in the different figures.

DETAILED DESCRIPTION

Figure 1:
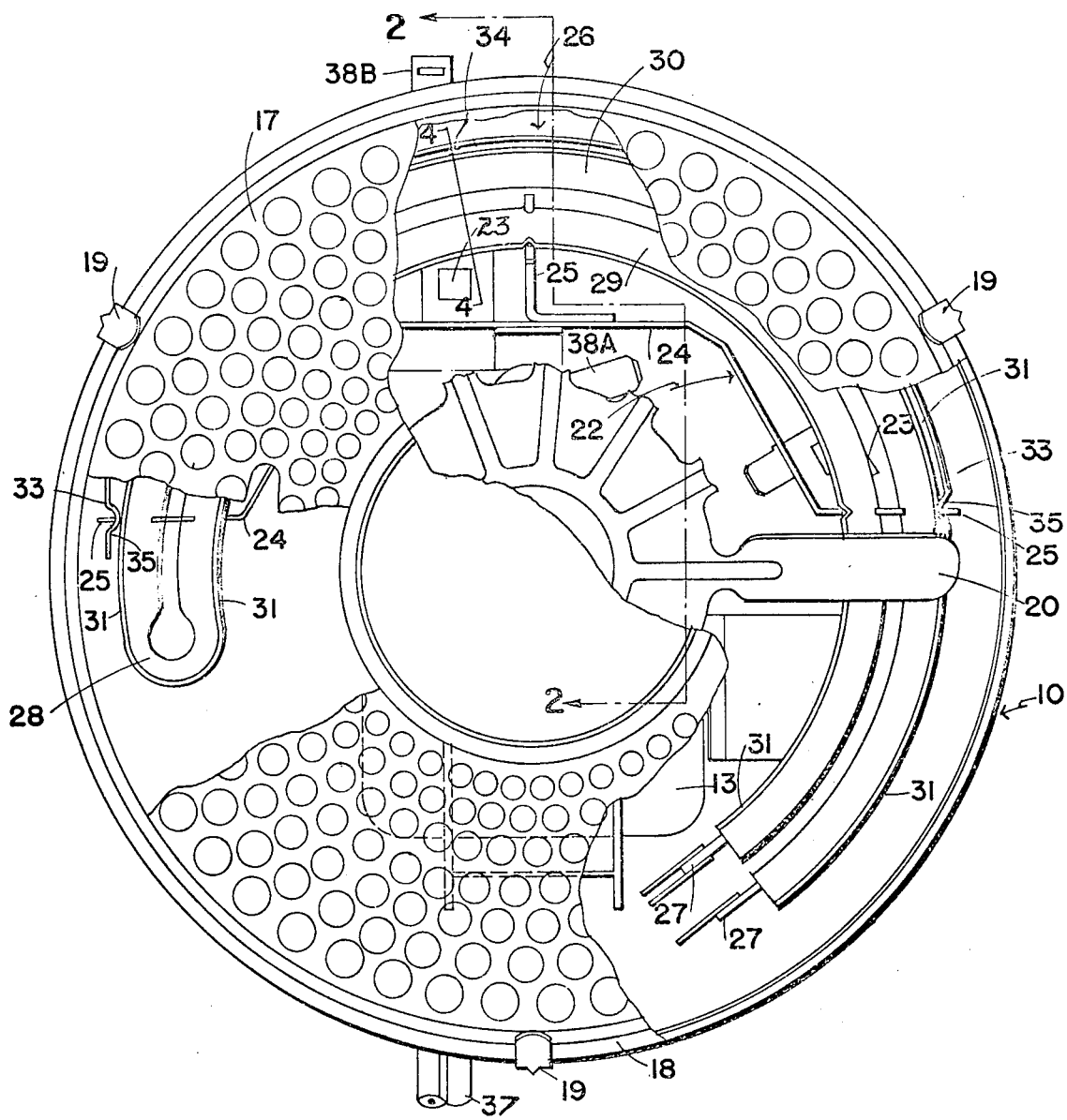
FIG. 1 is a top plan view of the device with the upper side of the casing broken away in part to show the interior thereof.

Proceeding therefore to describe the invention in detail reference should be made to the accompanying drawings in which 10 illustrates the casing generally. This casing includes a substantially planar base 11 which is circular and is provided with a substantially cylindrical recessed portion 12 within which an electrical motor 13 is mounted, secured by nut and bolt assemblies 14.

A perimetrically extending wall 15 is provided and this wall is multi-apertured as indicated by reference character 16. It is preferable that this wall be manufactured from expanded metal or the like for lightness and ease in manufacture.

Figure 2:
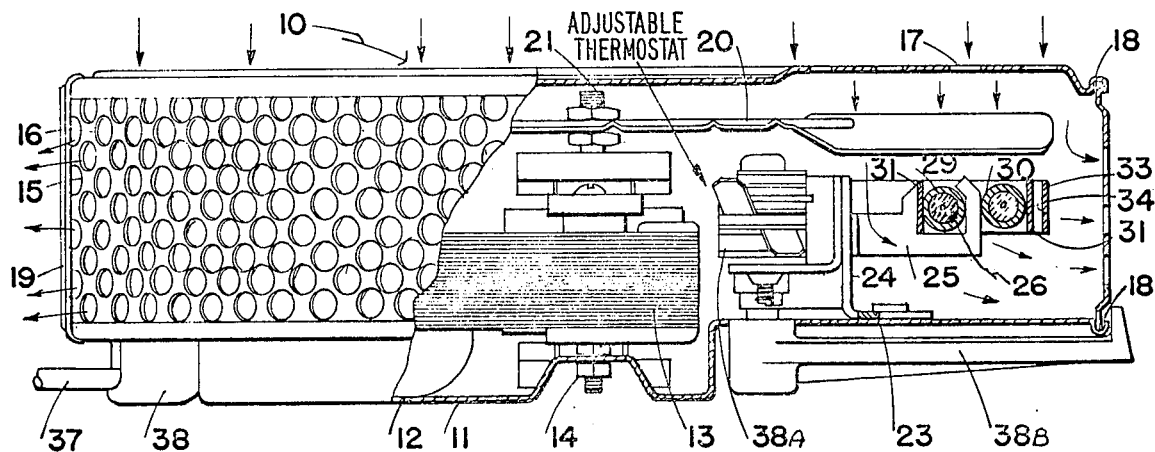
FIG. 2 is a side elevation of FIG. 1 partially sectioned to show the interior thereof.

A multi-apertured air intake plate 17 is provided which is also circular in shape and is maintained spaced and parallel to the base plate 11 by means of the perimetrical wall 15. In this regard, annular recesses 18 are formed around the periphery of the base plate 11 and the air intake plate 17, within which the edges of the perimetrical wall engage as clearly shown in the upper portion of FIG. 2. Spring clips 19 snap over these beaded recesses and maintain the casing in the assembled position. In this regard, the perimetrical wall 15 is normally made of a strip of apertured metal and the joining edges of this strip are preferably covered by one of the spring clips 19 when the casing is assembled.

A multi-bladed fan 20 is secured to the drive shaft 21 of the electric motor 13 and is adapted to rotate in a plane substantially parallel to the base 11 and the air intake plate 17 and in this embodiment, the fan blade component 20 is mounted just below the air intake plate 17.

The fan blades are angulated and rotated in a direction to draw air in through the plate 17 and to discharge it circumferentially through the perforated or multi-apertured wall 15.

An arcuately curved combination air baffle and heating element support is provided collectively designated 22 and this bracket includes a plurality of attaching tabs 23 securing same to the base plate 11 by means of rivets (not illustrated) or the equivalent, so that the major portion 24 of the bracket extends upwardly towards the air intake plate 17. Offstanding lugs 25 are provided which support the heating element collectively designated 26. This heating element is of a conventional rod type construction and includes terminal ends 27 by which it may be secured to a source of electrical power as will hereinafter be described.

The rod element 26 is counterangulated as at 28 thus forming an inner portion 29 and an outer portion 30 and both of these portions are arcuately curved having a curvature similar to the curvature of the perimetrical wall 15. When the inner and outer portions 29 and 30 are curved as aforesaid, they lie substantially spaced and parallel from one another as clearly shown in FIG. 1.

A metal strip 31 is secured as by welding 32, to the rod element 26 prior to same being formed so that when it is formed, this strip is situated on the side of the outer portion 30 adjacent the perimetrical wall 15, and on the inner portion 29, remote from the perimetrical wall 15 and this metal strip acts as a heat radiating means to improve the efficiency of the heating element 26.

A portion of the radiating strip 31 which is secured to the outer portion 30 of the rod element is provided with a guard strip 33 which lies spaced and parallel from the strip 31. The spaced and parallel relationship is provided, in this embodiment, by the provision of dimples 34 formed intermittently along the length of strip 33 as clearly illustrated in FIG. 4, the only point of contact with the strip 31 being via these dimples 34 so that heat transfer between the two strips is minimal. This guard strip is at the lower side of the heater when same is mounted in a vertical position.

The elements are clipped within the brackets or lugs 25 of the bracket 22 and the ends of the guard strip 33 are crimped as illustrated by reference character 35 to engage these lugs 25. The extremities of this guard strip 33 may be welded to the strip 31 adjacent these points. The guard strip extends approximately 180° between the end lugs of bracket 22.

A conventional electrical plug 36 connects to wires 37 which extend through the base plate 11 by means of a strain relief device 38 which is conventional. An adjustable and automatically operating thermostat control unit 38⁴ is provided which is conventional in manufacture which allows the operating temperature of the device to be adjusted by lever 38B within limits and which furthermore automatically cuts off the power to the heating element and the motor once a predetermined high temperature is reached. This is situated between bracket 22 and the fan motor 13 and is thus shielded from the heating element. Furthermore part of the air drawn in by the fan is deflected to the thermostat control unit for accurate sensing of the temperature of the intake air.

The wiring connections between the motor 13 and the heating element 26 are shown in FIG. 6 and are believed self-evident.

FIG. 3 shows alternate methods of mounting the device. Reference character 39 shows an angulated bracket which may be secured to the base plate 11 by means of screws 40. This permits the device to be mounted on the floor in a horizontal position or on either kick panel in a vertical position, conventional fastening means extending through the end lugs 41 of the bracket 39.

If, however, the device is to be mounted under the dash, then the angulated brackets 42 are secured by one end thereof to the base plate by similar screws 40. These brackets extend parallel to the perimetrical wall 15 and terminate in offstanding lugs 43 spaced above the air intake plate 17 and the device may be suspended from underneath the dash by fastening elements extending through lugs 43.

When connected to a source of electrical power through plug 36, the fan draws air in through the air intake plate 17, and expels it past the heating element 26 and through the perimetrical wall 15 in a 360° pattern, the overall temperature of the device being controlled within limits by the thermostatic component 38 adjustable by means of lever 38B.

Although one particular type of heating element has been illustrated and described, nevertheless it will be appreciated that other forms of heating element may be used with or without the heat radiating strip 31. For example, an element may be used, the construction of which provides sufficient radiating surface area without the necessity of adding a specific radiating strip or the like.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A heater for the interior of cars, trucks and the like adapted to be operated from a source of electrical power; comprising in combination a substantially cylindrical casing which includes a base plate, an air intake end plate, and an air discharge circumferential wall between said base plate and said air intake end plate, thus maintaining the same in substantially spaced and parallel relationship one with the other, a fan motor centrally mounted within said casing and upon said base plate and connectable to said source of electrical power, a fan driven by said motor in a plane substantially parallel to said base plate, said fan being situated above said motor and adjacent said air intake end plate, a heating element within said casing also connectable to said source of electrical power, said heating element being formed in a single length counterangulated between the ends thereof to form outer and inner portions, said portions being arcuately curved and having a degree of curvature similar to the degree of curvature of said perimetrical wall but lying spaced inwardly therefrom, said inner and outer portions lying substantially spaced and parallel one from the other, means to support said heating element within said casing, said means comprising a combination air deflector and support bracket secured to said base plate, said bracket being formed from a shaped flat plate extending upwardly from said base plate and being situated between part of said heater element and said fan motor, the upper edge of said bracket terminating just below said fan, said bracket extending around approximately 180° of said cylindrical casing, lugs extending radially outwardly from said bracket, the inner and outer portions of said heating element being supported by said lugs intermediate said base plate and said air intake end plate, and a guard strip between said heating element and said circumferential wall.

2. The heater according to claim 1 in which said guard strip comprises a flat strip situated normal to the plane of the base plate and being arcuately curved to a contour similar to the curvature of the outer portion of said heater element and extending substantially between the ends of said air deflector and support bracket and being supported by said lugs of said support bracket in a spaced and parallel relationship with said outer portion of said heating element.

3. The heater according to claim 2 which includes an arcuately curved heat radiating strip formed from a flat strip and being secured to the outer surface of said outer portion of said heating element and to the inner surface of said inner portion of said heating element and extending substantially the full length of said outer and inner portions, said heat radiating strip being situated between said guard strip and said heating element for the length of said guard strip.

4. The heater according to claim 3 which includes a thermostatic control operatively connected to said motor and said heater element and being connectable to the source of electrical power, said thermostatic control being situated between said fan motor and said combination air deflector and support bracket whereby said thermostatic control is shielded from said heating element by said support bracket, and part of the air drawn in said air intake end plate by said fan, is deflected over said thermostatic control.

5. The heater according to claim 2 which includes a thermostatic control operatively connected to said motor and said heater element and being connectable to the source of electrical power, said thermostatic control being situated between said fan motor and said combination air deflector and support bracket whereby said thermostatic control is shielded from said heating element by said support bracket, and part of the air drawn in said air intake end plate by said fan, is deflected over said thermostatic control.

6. The heater according to claim 1 which includes an arcuately curved heat radiating strip formed from a flat strip and being secured to the outer surface of said outer portion of said heating element and to the inner surface of said inner portion of said heating element and extending substantially the full length of said outer and inner portions, said heat radiating strip being situated between said guard strip and said heating element for the length of said guard strip.

7. The heater according to claim 6 which includes a thermostatic control operatively connected to said motor and said heater element and being connectable to the source of electrical power, said thermostatic control being situated between said fan motor and said combination air deflector and support bracket whereby said thermostatic control is shielded from said heating element by said support bracket, and part of the air drawn in said air intake end plate by said fan, is deflected over said thermostatic control.

8. The heater according to claim 1 which includes a thermostatic control operatively connected to said motor and said heater element and being connectable to the source of electrical power, said thermostatic control being situated between said fan motor and said combination air deflector and support bracket whereby said thermostatic control is shielded from said heating element by said support bracket, and part of the air drawn in said air intake end plate by said fan, is deflected over said thermostatic control.

* * * * *